United States Patent [19]
Ditlinger

[11] Patent Number: 5,355,774
[45] Date of Patent: Oct. 18, 1994

[54] AIRCRAFT BRAKE PISTON CAP ASSEMBLY

[75] Inventor: Richard J. Ditlinger, South Bend, Ind.

[73] Assignee: AlliedSignal Inc., Morristown, N.J.

[21] Appl. No.: 58,078

[22] Filed: May 5, 1993

[51] Int. Cl.$^5$ ............................................. F01B 29/00
[52] U.S. Cl. ......................................... 92/128; 92/13;
    92/129; 92/255; 92/256; 403/316
[58] Field of Search .................. 92/129, 128, 13, 255,
    92/256; 403/376, 316, 317

[56] References Cited

U.S. PATENT DOCUMENTS

| | | | |
|---|---|---|---|
| 3,136,230 | 6/1964 | Buckley | 92/128 |
| 3,365,979 | 1/1958 | Ericson | 92/255 |
| 3,474,710 | 10/1969 | Stryker | 92/128 |
| 4,917,003 | 4/1990 | Kollross | 92/256 |
| 5,116,178 | 5/1992 | Lerman et al. | 403/316 |
| 5,245,911 | 9/1993 | Yuda | 92/128 |

FOREIGN PATENT DOCUMENTS 2405263  9/1974  Fed. Rep. of Germany ........ 92/255

*Primary Examiner*—Thomas E. Denion
*Attorney, Agent, or Firm*—Larry J. Palguta; Leo H. McCormick, Jr.; Robert A. Walsh

[57] ABSTRACT

The improved aircraft brake piston cap assembly (40, 40') comprises an aircraft piston (10) having a pair of openings (46) extending through the piston (10) and a piston cap (42) with a flange (44) fitted around the circumference of the piston (10) and having a pair of openings (48) aligned with the openings (46) in the piston (10). A safety wire (50) may extend through the openings (46, 48) and be wrapped about a portion of the circumference of the piston cap so that the ends (52) are intertwined (53) to retain the safety wire (50) in place and the cap (42) attached to the piston (10), or a solid or spring pin (60, 60') may be press fitted into the openings (46, 48) of one of the piston cap (42) and piston (10) to attach the piston cap (42) to the piston (10). The improved piston cap assembly (40, 40') permits components within the piston (10) to be extended to axially longer dimensions, and provides an improved, efficient and reliable attachment of the piston cap (42) to the piston (10).

2 Claims, 2 Drawing Sheets

AIRCRAFT BRAKE PISTON CAP ASSEMBLY

The present invention relates generally to an improved piston cap assembly, and in particular to an improved piston cap assembly for an aircraft brake.

Aircraft brakes have utilized for many years a two-part piston and cap assembly which is extended by hydraulic pressure to compress the friction components of the brake. The piston assembly typically comprises piston 10 located slidably within piston bushing 12 as illustrated in FIG. 1. Piston 10 has interior opening 14 which houses spring 16 that seats against bottom 18 of the piston and biases washer 20 against expander tube 24 of ball and tube expander 22. Ball and tube expander 22 includes fixed shaft 26 having ball 28 engaged by expander tube 24. Exterior end 11 of piston 10 includes a pair of spaced apart grooves 13 and 15 which receive snap rings or spring retainers 17 and 19. Snap ring 17 positions washer 20 while retainer ring 19 provides attachment for piston cap 30. Grooves 13 and 15 are spaced apart a sufficient distance so that piston 10 is not weakened, and, because of the overall dimensions of the piston, spring 16 and adjuster tube 24 are limited to maximum axial dimensions. It is highly desirable to provide an improved piston cap assembly which permits the spring and expander tube 24 to have longer axial dimensions, and which would reduce the number of dimensions required to define and manufacture both the piston and piston cap.

The present invention accomplishes the above goals by providing an improved piston cap assembly for a brake, the brake including a bore slidably receiving a piston, the piston comprising a generally cylindrical tube having an exterior end enclosed by a piston cap, the exterior end having a first pair of openings extending through the piston and aligned with one another along a line truncating the exterior end of said piston, said piston cap having a second pair of openings extending through the piston cap and aligned with the openings of the piston, and means for attaching said piston cap to said piston extending through the aligned pairs of openings so that said piston cap is attached to said piston.

The invention is described in detail below with reference to the drawings which illustrate embodiments in which.

Similar structure in the drawings will be identified by the same reference numerals.

Figure 1:
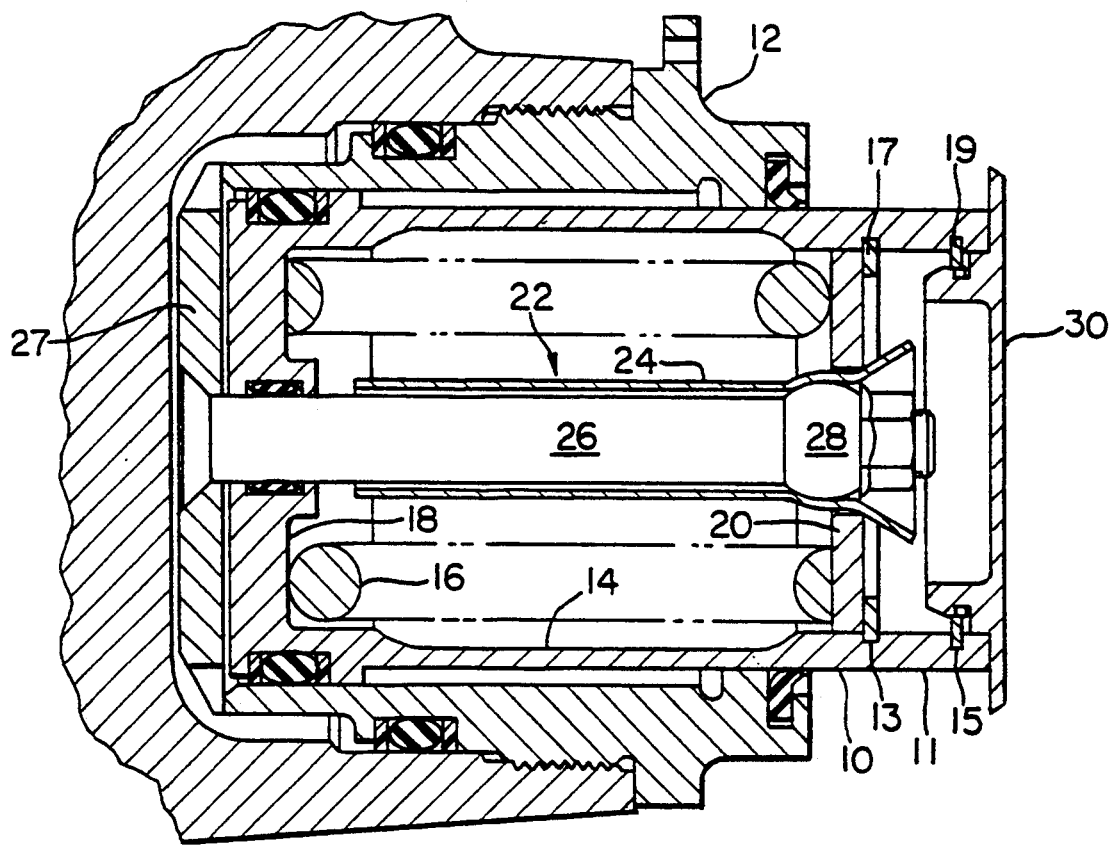
FIG. 1 is an illustration of a typical prior art hydraulic aircraft brake piston and piston cap assembly.
Figure 2:
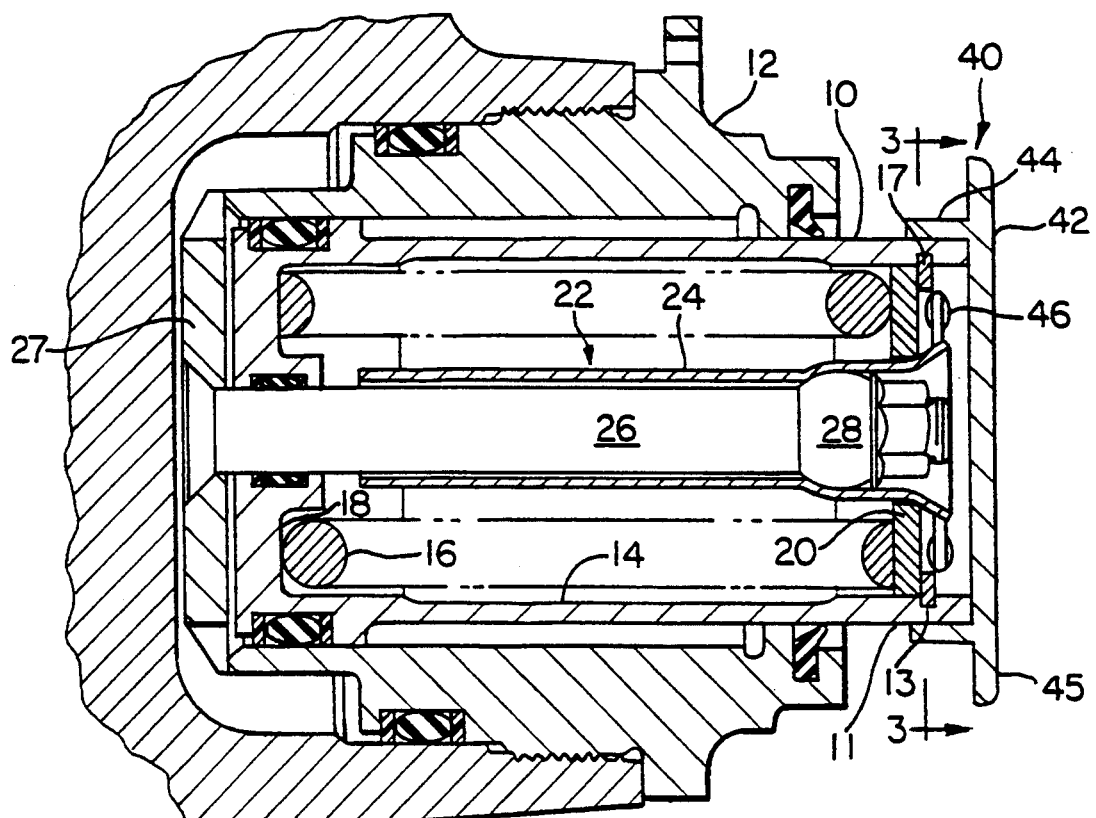
FIG. 2 is an illustration of a hydraulic aircraft brake piston and piston cap assembly in accordance with the present invention.

FIG. 2 illustrates an aircraft brake comprising bushing 12 receiving slidably piston 10. Piston 10, as in FIG. 1, includes interior opening 14 housing spring 16 having one end engaging piston bottom 18 and the other end engaging washer 20 which abuts snap ring 17 received within groove 13. Expander shaft 26 is attached to expander bottom 27 and includes ball 28 engaging expander tube 24 of tube expander 22. To spread the applied piston load, piston cap assembly 40 comprises piston cap 42 having an axially extending flange 44 received about the circumference of exterior end 11 of piston 10. Unlike prior assemblies, axially extending flange 44 is located exteriorly of interior opening 14 of piston 10. Exterior end 11 includes a pair of spaced apart openings 46 (see FIG. 3), the openings spaced oppositely from one another to lie along line X—X which truncates one side of exterior end 11 of piston 10. In similar manner, flange 44 of piston cap 42 includes a pair of spaced apart openings 48 that lie along line X—X which truncates one side or portion of piston flange 44. Openings 48 are in alignment with respective openings 46 of exterior end 11. In order to attach piston cap 42 to piston 10, safety wire 50 is inserted through aligned openings 48, 46 and ends 52 exterior to piston cap 42 are bent or laid over the circumference of flange 44 until the ends meet and are intertwined at 53 to secure the wire in place and effect retention of the piston cap to the piston. The double twist method of intertwining ends 52 of wire 50 may be utilized to provide intertwined end 53. Safety wire 50 may be a typical safety wire which is also utilized to attach bushings 12 to one another. Such a safety wire is identified by Military Standard 33540 which utilizes Military Standard 20995C41 wire.

Figure 4:
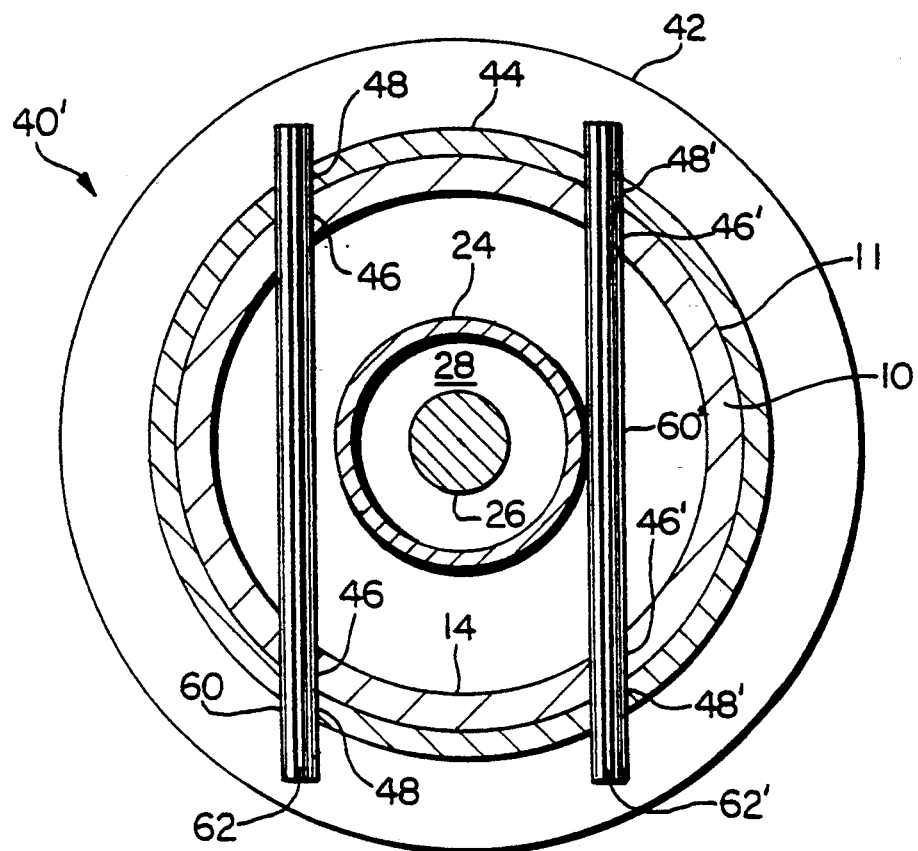
FIG. 4 is an alternative embodiment of the present invention.

FIG. 4 illustrates another embodiment of the present invention. Exterior end 11 of piston 10 includes a pair of spaced apart openings 46 which are aligned with openings 48 in flange 44 of piston cap 42. Pin 60 of cap assembly 40' extends through aligned openings 46, 48 to attach piston cap 42 to piston 10. Pin 60 may comprise either a solid pin or a typical spring pin which comprises a generally C-shaped cross-section pin having a hollow interior along its axial length, with circumferential ends of the pin spaced apart at 62. Thus, openings 46 and/or 48 may be sized so that when pin 60 is inserted through the aligned openings, a press fit is effected between pin 60 and either one of the aligned pairs of openings 46 and 48 and leaving clearance in the other pair of openings to relieve the pins of axial piston force. For example, a press fit engagement between pin 60 and openings 48 would suffice to retain pin 60 in place so that cap 42 remains in engagement with exterior end 11 of piston 10. Likewise, a press fit engagement between pin 60 and openings 46 would result in the retention of cap 42 to piston 10. Also, as illustrated in FIG. 4, additional pairs of openings 46', 48' can be located on the opposite side of piston 10 and cap 42 so that an additional pin 60' may be press fitted into a pair of openings to effect additional engagement of cap 42 to piston 10.

Figure 3:
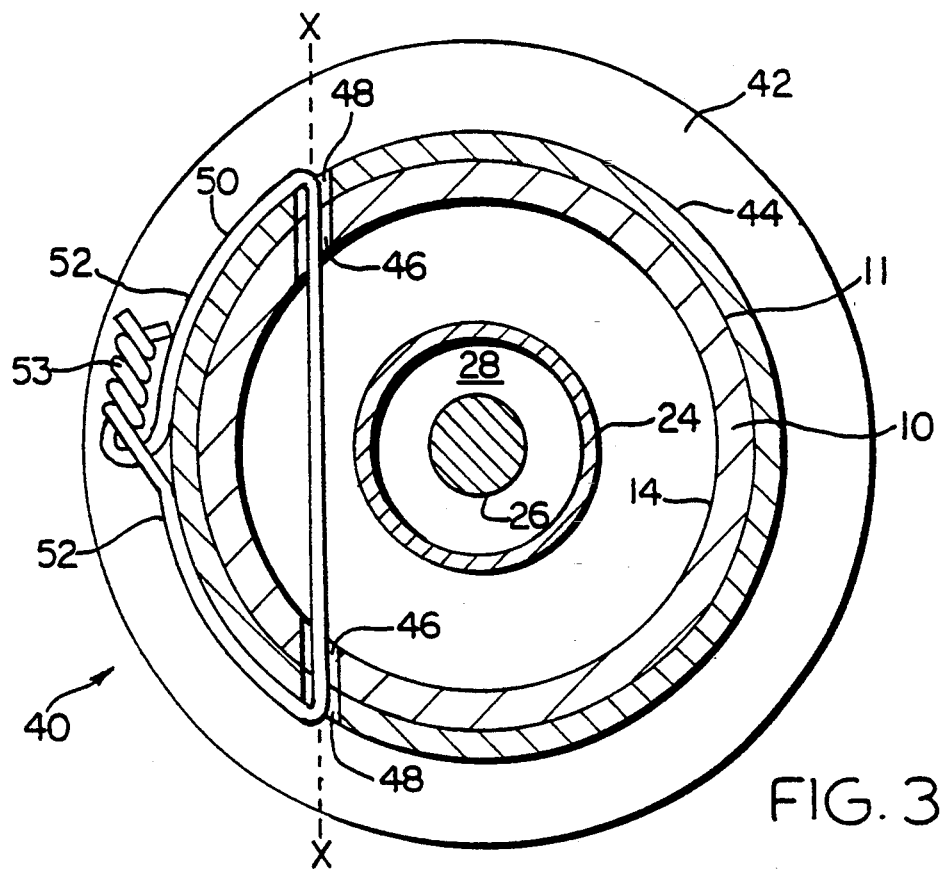
FIG. 3 is a section view taken along view line 3—3 of FIG. 2.

The improved piston cap assembly of the present invention provides several improvements over prior piston cap assembly designs. The present invention requires fewer dimensions to define and produce the parts and this results in less machining. The piston cap assembly and piston illustrated in FIG. 1 requires 18 dimensions to define the cap while the improved cap illustrated in FIGS. 2 and 3 requires only 11 dimensions. Additionally, the piston in FIG. 1 requires 5 dimensions to define groove 15 while the present invention illustrated in FIGS. 2 and 3 requires only 2 dimensions to define the openings in the piston. In addition, flange 44 stiffens and strengthens the unsupported cantilevered plate area 45 extending over the end 11 of piston 10. The embodiment illustrated in FIGS. 2 and 3 provides for a securement of the piston cap to the piston by means of safety wire rather than the formed spring clip 19 illustrated in FIG. 1, and this provides for a more positive retention. Utilization of the invention illustrated in FIGS. 2-4 results in the piston cap 42 not extending into piston interior opening 14. This permits for additional cavity space to be utilized so that the return spring 16 can be lengthened and resulting in a lower spring rate with lower spring stresses. A lower spring rate permits a greater step back or return of the piston and this provides for a larger brake running clearance. Lower stresses for the spring negates the need for more expensive lower modulus titanium springs rather than standard steel springs. Additionally, expander tube 24 can be lengthened and this results directly in a greater potential brake life because the tube is longer and provides for extended adjustment and wear of the friction members of the brake. Also, the overall width between the piston housing which seats bushing 12 and the backing plate (not shown) of the brake can be reduced by utilizing all of the piston cavity or interior opening, and that can result in substantial weight savings.

I claim:

1. An improved piston cap assembly for a brake, the brake including a bore slidably receiving a piston, the piston comprising a generally cylindrical tube having an interior opening and an exterior end which is enclosed by a piston cap, the exterior end having a first pair of openings extending through the piston and aligned with one another along a line truncating the exterior end of said piston, said piston cap having a second pair of openings extending through the piston cap and aligned with the openings of the piston, means for attaching said piston cap to said piston extending through the aligned pairs of openings so that said piston cap is attached to said piston, said attaching means comprising a wire having ends located exteriorly of said openings and extending to engagement with one another, and the piston cap including an axially extending flange which is located about the circumference of an outer axial surface of the piston, the aligned pairs of openings along said line truncating the exterior end of said piston and the axially extending flange about the outer axial surface of the piston providing increased space for components located within the interior opening of the piston.

2. The assembly in accordance with claim 1, wherein the components include an adjuster mechanism.

* * * * *